(12) United States Patent
Ramakrishnan

(10) Patent No.: US 10,252,790 B2
(45) Date of Patent: Apr. 9, 2019

(54) INLET ASSEMBLY FOR AN AIRCRAFT AFT FAN

(71) Applicant: General Electric Company, Schenectady, NY (US)

(72) Inventor: Kishore Ramakrishnan, Rexford, NY (US)

(73) Assignee: General Electric Company, Schenectady, NY (US)

( * ) Notice: Subject to any disclaimer, the term of this patent is extended or adjusted under 35 U.S.C. 154(b) by 251 days.

(21) Appl. No.: 15/234,055

(22) Filed: Aug. 11, 2016

(65) Prior Publication Data

US 2018/0043996 A1 Feb. 15, 2018

(51) Int. Cl.
*B64C 21/06* (2006.01)
*B64D 29/00* (2006.01)
(Continued)

(52) U.S. Cl.
CPC .............. *B64C 21/06* (2013.01); *B64D 29/00* (2013.01); *F02C 7/042* (2013.01); *F02K 3/062* (2013.01); *F02K 5/00* (2013.01); *F04D 19/002* (2013.01); *F04D 29/522* (2013.01); *F04D 29/542* (2013.01); *B64C 2230/04* (2013.01); *B64D 2033/0226* (2013.01); *F05D 2220/323* (2013.01); *F05D 2230/80* (2013.01); *F05D 2250/51* (2013.01); *Y02T 50/671* (2013.01)

(58) Field of Classification Search
CPC ................................ B64C 21/06; B64D 29/00
See application file for complete search history.

(56) References Cited

U.S. PATENT DOCUMENTS 4,232,515 A 11/1980 Brown
4,240,250 A * 12/1980 Harris .................... F02C 7/045
415/119

(Continued)

FOREIGN PATENT DOCUMENTS

CA 1314035 C 3/1993
CN 102336267 B 4/2014
(Continued)

OTHER PUBLICATIONS

Samimi et al., "Canard-Wing Interactions in Subsonic Flow", IJST, Transactions of Mechanical Engineering, vol. 37, Issue M2, pp. 133-147, 2013.
(Continued)

*Primary Examiner* — Justin M Benedik
(74) *Attorney, Agent, or Firm* — GE Global Patent Operation; Nitin N. Joshi

(57) ABSTRACT

The present disclosure is directed to a low-distortion inlet assembly for reducing airflow swirl distortion entering an aft fan mounted to a fuselage of an aircraft. Further, the inlet assembly includes a plurality of structural members, such as struts or strakes, mounted at predetermined locations around a circumference of the fan shaft of the fan at the inlet. The predetermined location(s) may be determined as a function of swirl distortion entering the inlet. As such, the structural member(s) are configured to reduce swirl distortion of the airflow entering the fan. In some embodiments, the inlet assembly may also include inlet guide vanes. In alternative embodiments, the inlet assembly may be absent of inlet guide vanes.

19 Claims, 8 Drawing Sheets

(51) Int. Cl.
  *F02K 3/062* (2006.01)
  *F04D 19/00* (2006.01)
  *F04D 29/52* (2006.01)
  *F04D 29/54* (2006.01)
  *F02K 5/00* (2006.01)
  *F02C 7/042* (2006.01)
  *B64D 33/02* (2006.01)

(56) References Cited

U.S. PATENT DOCUMENTS

| | | | |
|---|---|---|---|
| 4,917,336 A | 4/1990 | Jacobs et al. |
| 5,314,301 A | 5/1994 | Knight |
| 6,082,966 A | 7/2000 | Hall et al. |
| 6,292,763 B1 | 9/2001 | Dunbar et al. |
| 6,619,916 B1 | 9/2003 | Capozzi et al. |
| 6,709,232 B1 | 3/2004 | Vogiatzis et al. |
| 6,715,983 B2 | 4/2004 | Koshoffer et al. |
| 6,820,411 B2 | 11/2004 | Pederson et al. |
| 7,070,146 B2 | 7/2006 | Morgenstern et al. |
| 7,114,911 B2 | 10/2006 | Martin et al. |
| 7,195,456 B2 | 3/2007 | Aggarwala et al. |
| 7,416,155 B2 | 8/2008 | Cuccias et al. |
| 7,444,802 B2 | 11/2008 | Parry |
| 7,617,670 B2 | 11/2009 | Truax et al. |
| 7,784,732 B2 | 8/2010 | Owens et al. |
| 8,651,813 B2 | 2/2014 | Long |
| 8,840,061 B2 | 9/2014 | Caruel et al. |
| 8,894,361 B2 | 11/2014 | Rodriguez et al. |
| 8,973,370 B2 | 3/2015 | Conners |
| 8,979,018 B2 | 3/2015 | Pflug et al. |
| 9,074,483 B2 | 7/2015 | Breeze-Stringfellow et al. |
| 2007/0012046 A1 | 1/2007 | Larsson et al. |
| 2009/0155072 A1 | 6/2009 | Winter |
| 2010/0158684 A1 | 6/2010 | Baralon |
| 2011/0164967 A1 | 7/2011 | Elorza et al. |
| 2012/0163960 A1 | 6/2012 | Ress, Jr. et al. |
| 2015/0086339 A1 | 3/2015 | Orosa |
| 2016/0052621 A1* | 2/2016 | Ireland ............ B64C 21/04 137/13 |
| 2017/0081035 A1* | 3/2017 | Becker ............ B64C 21/06 |
| 2017/0101191 A1* | 4/2017 | Becker ............ B64D 27/18 |

FOREIGN PATENT DOCUMENTS

| | | | | |
|---|---|---|---|---|
| EP | 0320620 A1 * | 6/1989 | ............ F01D 9/042 |
| FR | 3052743 A1 * | 12/2017 | |
| SE | 528183 C2 | 9/2006 | |
| WO | 1982000048 A1 | 1/1982 | |
| WO | 2005044661 A2 | 5/2005 | |

OTHER PUBLICATIONS

Owens et al., "Boundary-Layer-Ingesting Inlet Flow Control", Proposed Journal of Aircraft American Institute of Aeronautics and Astronautics, Article v 1.9, pp. 1-31.

Paul et al., "Experimental Studies of Active and Passive Flow Control Techniques Applied in a Twin Air-Intake", The Scientific World Journal, vol. 2013, Jun. 2013.

* cited by examiner

INLET ASSEMBLY FOR AN AIRCRAFT AFT FAN

FIELD OF THE INVENTION

The present subject matter relates generally to aft engines for aircraft propulsion systems, and more particularly to an inlet assembly for an aft fan of the aft engine that reduces swirl distortion of airflow entering the fan.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and the fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines also has an effect on the net propulsive thrust of the aircraft. A total amount of drag on the aircraft, including skin friction, form, and induced drag, is generally proportional to a difference between a freestream velocity of air approaching the aircraft and an average velocity of a wake downstream from the aircraft that is produced due to the drag on the aircraft.

As such, systems have been proposed to counter the effects of drag and/or to improve an efficiency of the turbofan jet engines. For example, certain propulsion systems incorporate boundary layer ingestion systems to route a portion of relatively slow moving air forming a boundary layer across, e.g., the fuselage and/or the wings, into the turbofan jet engines. Although this configuration can reduce drag by reenergizing the boundary layer airflow downstream from the aircraft, the relatively slow moving flow of air from the boundary layer entering the turbofan jet engine generally has a non-uniform or distorted velocity profile. As a result, such turbofan jet engines can experience an efficiency loss minimizing or negating any benefits of reduced drag on the aircraft.

In addition, some propulsion systems include an electrically-driven aft engine having an aft fan on the aircraft empennage to derive propulsive benefit by ingesting fuselage boundary layers. During operation, the inlet of the aft fan can see a strong swirl distortion due to upward flow from the bottom of the fuselage to the top. The swirl distortion can be detrimental to fan operability and can cause aeromechanical and/or operational issues.

Thus, an improved inlet assembly for an aft fan that addresses the aforementioned issue would be welcomed in the art. More particularly, an inlet assembly of the aft fan that reduces the swirl distortion would be especially beneficial.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a boundary layer ingestion fan assembly for mounting to an aft end of a fuselage of an aircraft. The boundary layer ingestion fan assembly includes a fan rotatable about a central axis of the boundary layer ingestion fan. More specifically, the fan includes a plurality of fan blades rotatable about a fan shaft that extends along the central axis. The fan assembly also includes a nacelle or housing surrounding the plurality of fan blades of the fan. As such, the nacelle defines an inlet with the fuselage of the aircraft. More particularly, the inlet extends substantially around the fuselage of the aircraft when the boundary layer ingestion fan is mounted at the aft end of the aircraft. The fan assembly also includes a low-distortion inlet assembly configured with the inlet for reducing swirl distortion of the airflow entering the inlet. More specifically, the inlet assembly includes one or more inlet guide vanes configured within the inlet and one or more structural members mounted at predetermined radial locations around a circumference of the fan shaft of the fan at the inlet. Accordingly, the structural members and optionally the inlet guide vanes are configured to reduce the swirl distortion entering the inlet of the fan.

In another aspect, the present disclosure is directed to a low-distortion inlet assembly for an aft fan mounted to a fuselage of an aircraft. The inlet assembly includes a plurality of structural members mounted at predetermined locations around a circumference of the fan shaft of the fan at the inlet. The predetermined location(s) may be determined as a function of swirl distortion entering the inlet. Further, the inlet assembly may be absent of inlet guide vanes. In such embodiments, the structural members guide the airflow axially to prevent generation of stream-wise vorticity, thereby eliminating the need for inlet guide vanes in the inlet assembly or reducing the number of inlet guide vanes needed.

In yet another aspect, the present disclosure is directed to a method for retrofitting a boundary layer ingestion fan for an aft end of a fuselage of an aircraft with an inlet assembly configured to reduce swirl distortion at an inlet of the fan. The method includes determining one or more locations around a circumference of a fan shaft of the fan having a swirl distortion exceeding a predetermined threshold. More specifically, the step of determining the location(s) having a swirl distortion exceeding the predetermined threshold may include using computer modeling to determine which locations around the circumference of the inlet experience the highest swirl distortion. As such, the method also includes replacing one or more inlet guide vanes at the predetermined locations with one or more structural members.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
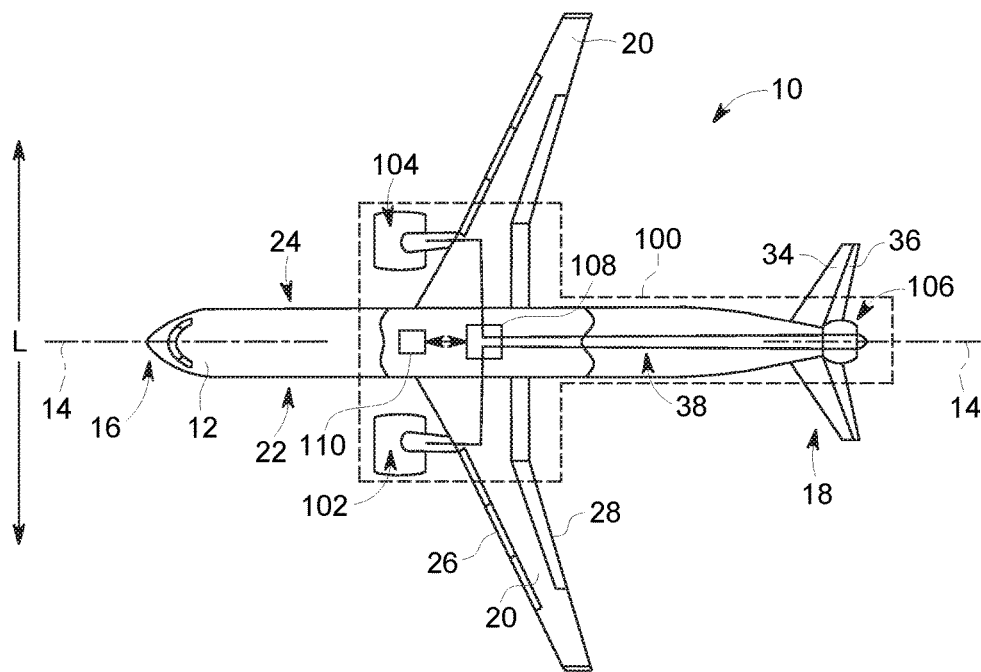
FIG. 1 illustrates a top view of one embodiment of an aircraft according to the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Generally, the present disclosure is directed to a low-distortion inlet assembly for reducing airflow swirl distortion entering an aft fan mounted to a fuselage of an aircraft. More specifically, the inlet assembly includes a plurality of structural members, such as struts or strakes, mounted at predetermined locations around a circumference of the fan shaft of the fan at the inlet. The predetermined location(s) may be determined as a function of swirl distortion entering the inlet, e.g. using computer modeling. As such, placement of the structural member(s) at the predetermined locations is configured to reduce swirl distortion of the airflow entering the fan. In some embodiments, the inlet assembly may also include inlet guide vanes, with some of the inlet guide vanes being replaced with a fewer number of the structural members so as to reduce drag and/or weight of the inlet assembly. In alternative embodiments, the inlet assembly may be absent of inlet guide vanes altogether.

Figure 2:
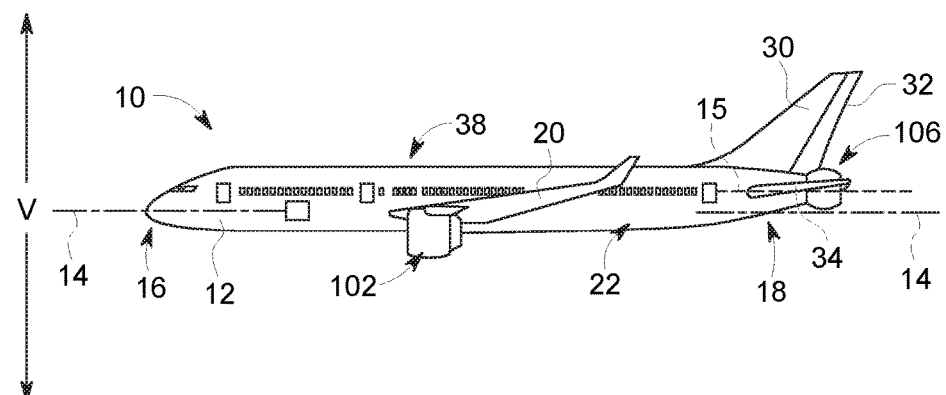
FIG. 2 illustrates a port side view of the aircraft of FIG. 1.

Referring now to the drawings, wherein identical numerals indicate the same elements throughout the figures, FIG. 1 illustrates a top view of one embodiment of the aircraft 10 according to the present disclosure. FIG. 2 illustrates a port side view of the aircraft 10 as illustrated in FIG. 1. As shown in FIGS. 1 and 2 collectively, the aircraft 10 defines a longitudinal centerline 14 that extends therethrough, a vertical direction V, a lateral direction L, a forward end 16, and an aft end 18.

Moreover, the aircraft 10 includes a fuselage 12, extending longitudinally from the forward end 16 of the aircraft 10 towards the aft end 18 of the aircraft 10, and a pair of wings 20. As used herein, the term "fuselage" generally includes all of the body of the aircraft 10, such as an empennage of the aircraft 10 and an outer surface or skin 38 of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Further, as shown in the illustrated embodiment, each of the wings 20 depicted includes one or more leading edge flaps 26 and one or more trailing edge flaps 28. The aircraft 10 may also include a vertical stabilizer 30 having a rudder flap 32 for yaw control, and a pair of horizontal stabilizers 34, each having an elevator flap 36 for pitch control. It should be appreciated however, that in other exemplary embodiments of the present disclosure, the aircraft 10 may additionally or alternatively include any other suitable configuration of stabilizer that may or may not extend directly along the vertical direction V or horizontal/lateral direction L.

In addition, the aircraft 10 of FIGS. 1 and 2 includes a propulsion system 100, herein referred to as "system 100." The system 100 includes a pair of aircraft engines, at least one of which mounted to each of the pair of wings 20, and an aft engine. For example, as shown, the aircraft engines are configured as turbofan jet engines 102, 104 suspended beneath the wings 20 in an under-wing configuration. Additionally, the aft engine is configured as an engine that ingests and consumes air forming a boundary layer over the fuselage 12 of the aircraft 10. Specifically, the aft engine is configured to ingest and consume air forming a boundary layer over the fuselage 12 of the aircraft 10, i.e., the aft engine is a Boundary Layer Ingestion (BLI) fan 106. Further, as shown in FIG. 2, the BLI fan 106 is mounted to the aircraft 10 at a location aft of the wings 20 and/or the jet engines 102, 104, such that a central axis 15 extends therethrough. As used herein, the "central axis" refers to a midpoint line extending along a length of the BLI fan 106. Further, for the illustrated embodiment, the BLI fan 106 is fixedly connected to the fuselage 12 at the aft end 18, such that the BLI fan 106 is incorporated into or blended with a tail section at the aft end 18. However, it should be appreciated that in various other embodiments, some of which will be discussed below, the BLI fan 106 may alternatively be positioned at any suitable location of the aft end 18.

In various embodiments, the jet engines 102, 104 may be configured to provide power to an electric generator 108 and/or an energy storage device 110. For example, one or both of the jet engines 102, 104 may be configured to provide mechanical power from a rotating shaft (such as an LP shaft or HP shaft) to the electric generator 108. Additionally, the electric generator 108 may be configured to convert the mechanical power to electrical power and provide such electrical power to one or more energy storage devices 110 and/or the BLI fan 106. Accordingly, in such embodiments, the propulsion system 100 may be referred to as a gas-electric propulsion system. It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner.

Figure 3:
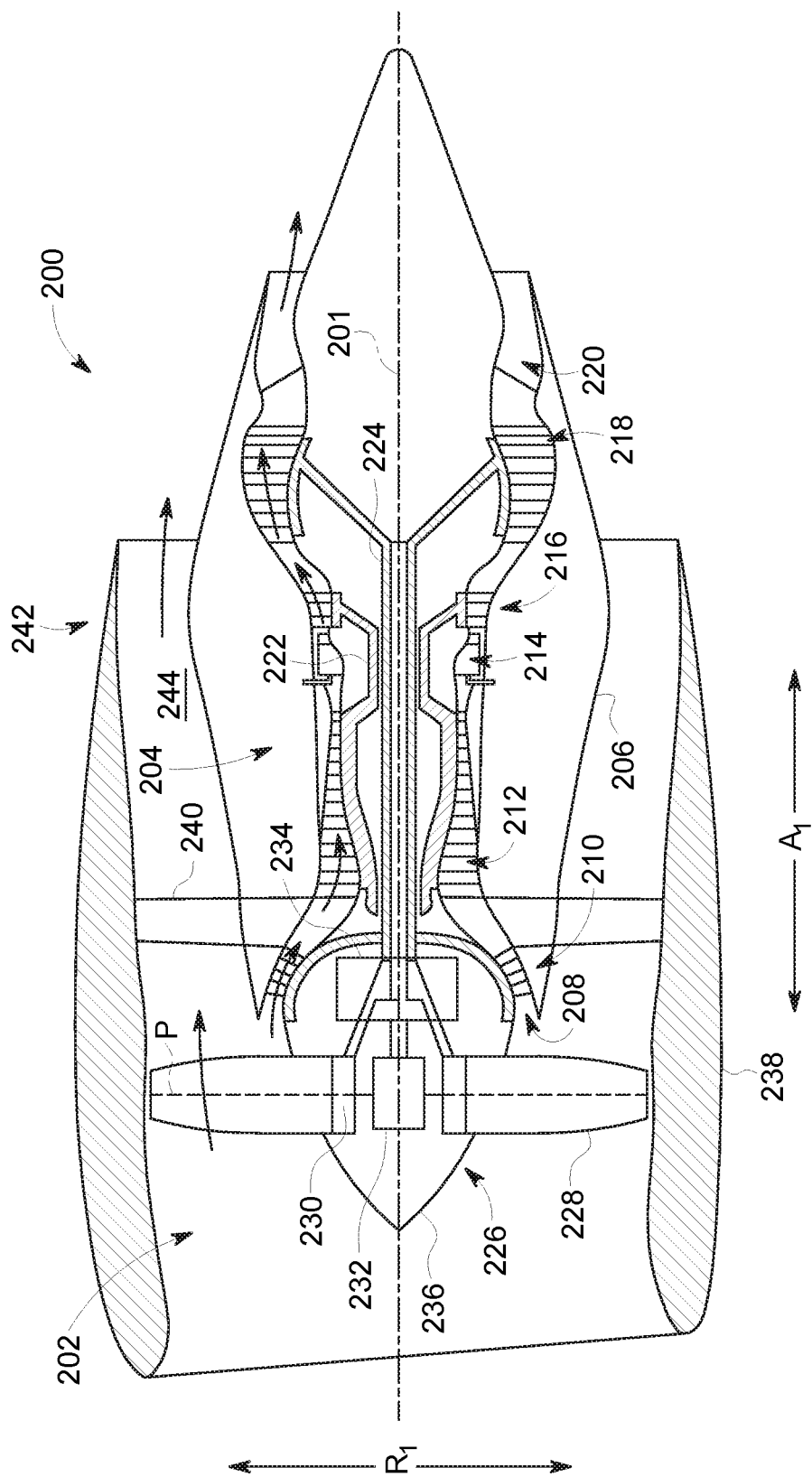
FIG. 3 illustrates a schematic, cross-sectional view of one embodiment of a gas turbine engine mounted to one of the wings of the aircraft of FIG. 1.

Referring now to FIG. 3, in certain embodiments, the jet engines 102, 104 may be configured as high-bypass turbofan jet engines. More specifically, FIG. 3 illustrates a schematic cross-sectional view of one embodiment of a high-bypass turbofan jet engine 200, herein referred to as "turbofan 200." In various embodiments, the turbofan 200 may be representative of jet engines 102, 104. Further, as shown, the turbofan 200 engine 10 defines an axial direction $A_1$ (extending parallel to a longitudinal centerline 201 provided for reference) and a radial direction $R_1$. In general, the turbofan 200 includes a fan section 202 and a core turbine engine 204 disposed downstream from the fan section 202.

In particular embodiments, the core turbine engine 204 generally includes a substantially tubular outer casing 206 that defines an annular inlet 208. It should be appreciated, that as used herein, terms of approximation, such as "approximately," "generally," "substantially," or "about," refer to being within a thirty percent margin of error. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

Further, as shown, the fan section 202 may include a variable pitch fan 226 having a plurality of fan blades 228 coupled to a disk 230 in a spaced apart manner. As depicted, the fan blades 228 extend outwardly from the disk 230 generally along the radial direction $R_1$. Each fan blade 228 is rotatable relative to the disk 230 about a pitch axis by virtue of the fan blades 228 being operatively coupled to a suitable actuation member 232 configured to collectively vary the pitch of the fan blades 228 in unison. As such, the fan blades 228, the disk 230, and the actuation member 232 are together rotatable about the longitudinal axis 12 by LP shaft 224 across a power gearbox 234. In certain embodiments, the power gearbox 234 includes a plurality of gears for stepping down the rotational speed of the LP shaft 224 to a more efficient rotational fan speed.

Referring still to FIG. 3, the disk 230 is covered by rotatable front hub 236 aerodynamically contoured to promote an airflow through the plurality of fan blades 228. Additionally, the fan section 202 includes an annular fan casing or outer nacelle 238 that circumferentially surrounds the fan 226 and/or at least a portion of the core turbine engine 204. It should be appreciated that the outer nacelle 238 may be configured to be supported relative to the core turbine engine 204 by a plurality of circumferentially-spaced outlet guide vanes 240. Moreover, a downstream section 242 of the nacelle 238 may extend over an outer portion of the core turbine engine 204 so as to define a bypass airflow passage 244 therebetween.

In addition, it should be appreciated that the turbofan engine 200 depicted in FIG. 3 is by way of example only, and that in other exemplary embodiments, the turbofan engine 200 may have any other suitable configuration. Further, it should be appreciated, that in other exemplary embodiments, the jet engines 102, 104 may instead be configured as any other suitable aeronautical engine.

Figure 4:
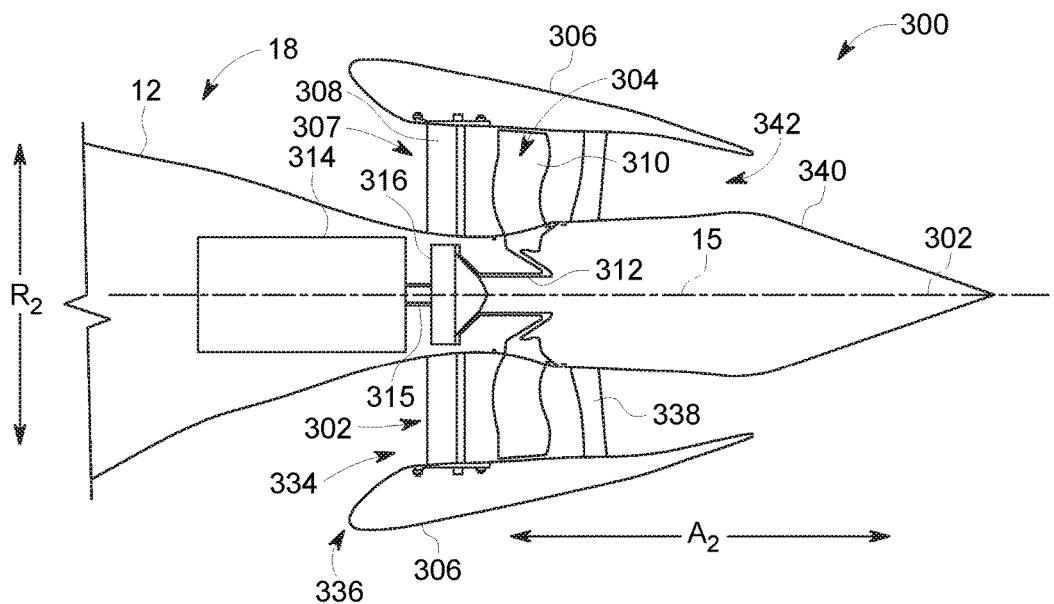
FIG. 4 illustrates a schematic, cross-sectional view of one embodiment of an aft engine according to the present disclosure.

Referring now to FIG. 4, a schematic, cross-sectional side view of an aft engine in accordance with various embodiments of the present disclosure is provided, such as the aft engine mounted to the aircraft 10 at the tail section 18 of the aircraft 10. More specifically, as shown, the aft engine is configured as a boundary layer ingestion (BLI) fan 300. The BLI fan 300 may be configured in substantially the same manner as the BLI fan 106 described above with reference to FIGS. 1 and 2 and the aircraft 10 may be configured in substantially the same manner as the exemplary aircraft 10 described above with reference to FIGS. 1 and 2.

Figure 6:
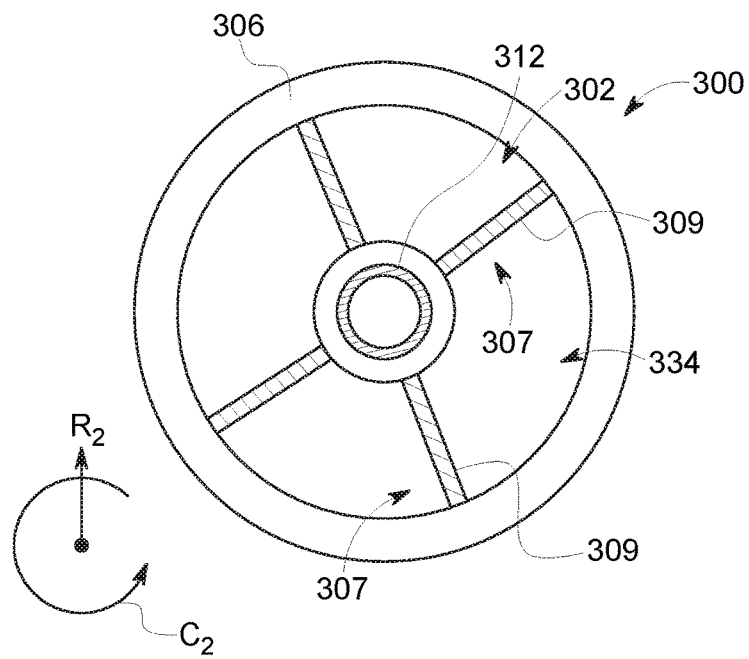
FIG. 6 illustrates a schematic, cross-sectional view of an aft engine of an aircraft, viewed along an axial centerline thereof so as to illustrate one embodiment of an inlet assembly according to the present disclosure.
Figure 7:
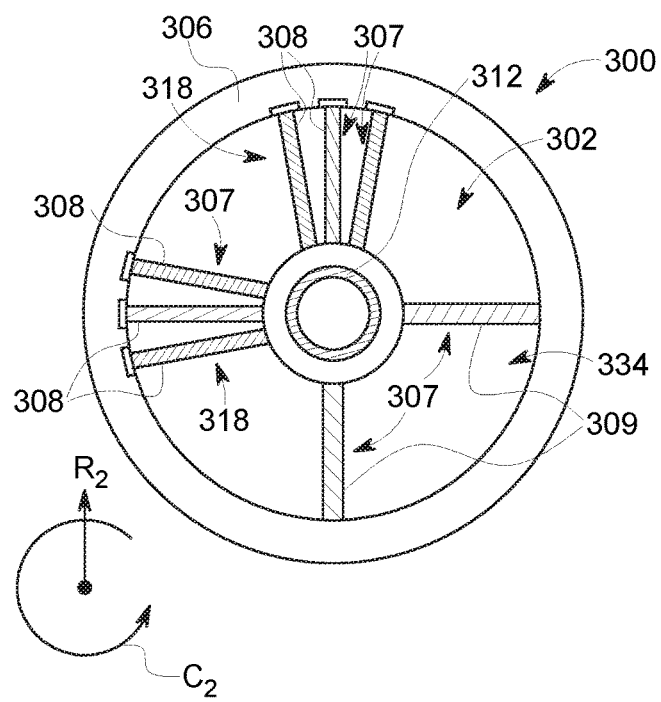
FIG. 7 illustrates a schematic, cross-sectional view of an aft engine of an aircraft, viewed along an axial centerline thereof so as to illustrate another embodiment of an inlet assembly according to the present disclosure.

More specifically, as shown, the BLI fan 300 defines an axial direction $A_2$ extending along the central axis 15 that extends therethrough for reference. Additionally, the BLI fan 300 defines a radial direction $R_2$ and a circumferential direction $C_2$ (FIGS. 6 and 7). In general, the BLI fan 300 includes a fan 304 rotatable about the central axis 15, a nacelle 306 extending around at least a portion of the fan 304, and optionally one or more inlet guide vanes 308 extending between the nacelle 306 and the fuselage 12 of the aircraft 10. In alternative embodiments, the BLI fan 300 may be absent of the inlet guide vanes 308 as discussed in more detail below in reference to FIG. 6. Further, the fan 304 includes a plurality of fan blades 310 spaced generally along the circumferential direction $C_2$. Moreover, where present, the inlet guide vanes 308 extend between the nacelle 306 and the fuselage 12 of the aircraft 10 at a location forward of the plurality of fan blades 310. More specifically, as shown, the inlet guide vanes 308 generally extend substantially along the radial direction $R_2$ of the BLI fan 300 between the nacelle 306 and the fuselage 12 of the aircraft 10 for mounting the BLI fan 300 to the fuselage 12 of the aircraft 10. In addition, as shown in FIG. 7, the inlet guide vanes 308 may be placed in groups 318 at predetermined locations around the circumference of the fan shaft 312 (i.e. spaced along the circumferential direction $C_2$ of the BLI fan 300). For example, as shown in the illustrated embodiment, the inlet assembly 302 includes two groups 318 of two inlet guide vanes 308. In alternative embodiments, the inlet assembly 302 may include more than two groups 318 of inlet guide vanes 308 at any circumferential location having any suitable number of inlet guide vanes 308. In addition, for embodiments having more than one inlet guide vane group 318, each group 318 may include the same number of inlet guide vanes 308 or a different number of inlet guide vanes 308.

Further, the inlet guide vanes 308 may be shaped and/or oriented to direct and/or condition a flow of air into the BLI fan 300 to, e.g., increase an efficiency of the BLI fan 300, or reduce a distortion of the air flowing into the BLI fan 300. In addition, it should be understood that the inlet guide vanes 308 may be configured as fixed inlet guide vanes extending between the nacelle 306 and the fuselage 12 of the aircraft 10. Alternatively, the inlet guide vanes 308 may be configured as variable inlet guide vanes.

Figure 5:
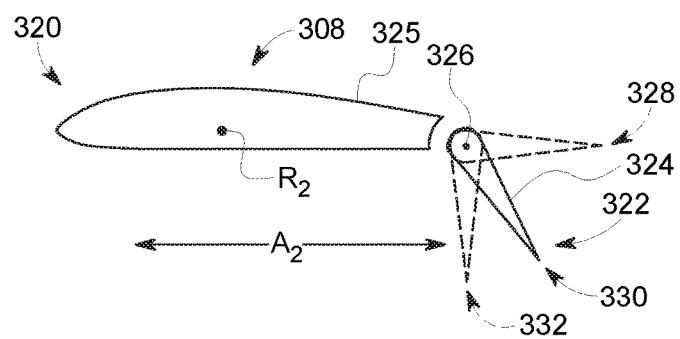
FIG. 5 illustrates a cross-sectional view of one embodiment of an inlet guide vane of an inlet assembly according to the present disclosure, particularly illustrating an inlet guide vane having a rotatable flap at a trailing edge thereof.

For example, as shown in FIG. 5, a cross-sectional view of one of the inlet guide vanes 308 taken along the radial direction $R_2$ is illustrated. As shown, the inlet guide vane 308 extends between a forward, upstream end 320 and an aft, downstream end 322. A body 325 of the inlet guide vane 308 is fixed relative to the nacelle 306 of the BLI fan 300 and the fuselage 12 of the aircraft 10. In addition, as shown, the inlet guide vanes 308 may also include an optional flap 324 at the aft end 320 configured to rotate about a substantially radial axis 326. For example, as shown, the flap 324 is configured to rotate between a first position 328 (in phantom), a neutral position 330, a second position 332 (in phantom), and a potentially infinite number of positions therebetween. By rotating the flap 324 between the various positions, the inlet guide vanes 308 may be configured to vary a direction in which air flowing thereover is directed.

Additionally, the nacelle 306 extends around and encircles the plurality of fan blades 310, and also extends around the fuselage 12 of the aircraft 10 at an aft end 18 of the aircraft 10 when, as shown in FIG. 4, the BLI fan 300 is mounted to the aircraft 10. Notably, as used herein, the term "nacelle" includes the nacelle as well as any structural fan casing or housing. As is also depicted in FIG. 4, the fan 304 additionally includes a fan shaft 312 with the plurality of fan blades 310 attached thereto. Although not depicted, the fan shaft 312 may be rotatably supported by one or more bearings located forward of the plurality of fan blades 310 and, optionally, one or more bearings located aft of the plurality of fan blades 310. Such bearings may be any suitable combination of roller bearings, ball bearings, thrust bearings, etc.

In certain embodiments, the plurality of fan blades 310 may be attached in a fixed manner to the fan shaft 312, or alternatively, the plurality of fan blades 310 may be rotatably attached to the fan shaft 312. For example, the plurality of fan blades 310 may be attached to the fan shaft 312 such that a pitch of each of the plurality of fan blades 310 may be changed, e.g., in unison, by a pitch change mechanism (not shown). Changing the pitch of the plurality of fan blades 310 may increase an efficiency of the BLI fan 300 and/or may allow the BLI fan 300 to achieve a desired thrust profile. With such an embodiment, the BLI fan 300 may be referred to as a variable pitch BLI fan.

The fan shaft 312 is mechanically coupled to a power source 314 located at least partially within the fuselage 12 of the aircraft 10, forward of the plurality of fan blades 310. Further, as shown, the fan shaft 312 is mechanically coupled to the power source 314 through a gearbox 316. The gearbox 316 may be configured to modify a rotational speed of the power source 314, or rather of a shaft 315 of the power source 314, such that the fan 304 of the BLI fan 300 rotates at a desired rotational speed. The gearbox 316 may be a fixed ratio gearbox, or alternatively, the gearbox 316 may define a variable gear ratio. With such an embodiment, the gearbox 316 may be operably connected to, e.g., a controller of the aircraft 10 for changing its ratio in response to one or more flight conditions.

In certain embodiments, the BLI fan 300 may be configured with a gas-electric propulsion system, such as the gas-electric propulsion system 100 described above with reference to FIG. 1. In such an embodiment, the power source 314 may be an electric motor that receives power from one or both of an energy storage device or an electric generator—such as the energy storage device 110 or electric generator 108 of FIGS. 1 and 2, the electric generator 108 converting mechanical power received from one or more under-wing mounted aircraft engines to electric power. However, in other embodiments, the power source 314 may instead be any other suitable power source. For example, the power source 314 may alternatively be configured as a gas engine, such as a gas turbine engine or internal combustion engine. Moreover, in certain exemplary embodiments, the power source 314 may be positioned at any other suitable location within, e.g., the fuselage 12 of the aircraft 10 or the BLI fan 300. For example, in certain embodiments, the power source 314 may be configured as a gas turbine engine positioned at least partially within the BLI fan 300.

Referring still to FIG. 4, the BLI fan 300 may also additionally include one or more outlet guide vanes 338 and a tail cone 340. As shown in the illustrated embodiment, the outlet guide vanes 338 extend between the nacelle 306 and the tail cone 340 for directing a flow of air through the BLI fan 300, and optionally for adding strength and rigidity to the BLI fan 300. Further, the outlet guide vanes 338 may be evenly spaced along the circumferential direction $C_2$ or may have any other suitable spacing. Additionally, the outlet guide vanes 338 may be fixed outlet guide vanes, or alternatively may be variable outlet guide vanes.

Further, aft of the plurality of fan blades 310, and for the embodiment depicted, aft of the one or more outlet guide vanes 338, the BLI fan 300 additionally defines a nozzle 342 between the nacelle 306 and the tail cone 340. As such, the nozzle 342 may be configured to generate an amount of thrust from the air flowing therethrough. In addition, the tail cone 340 may be shaped to minimize an amount of drag on the BLI fan 300. However, in other embodiments, the tail cone 340 may have any other shape and may, e.g., end forward of an aft end of the nacelle 306 such that the tail cone 340 is enclosed by the nacelle 306 at an aft end. Additionally, in other embodiments, the BLI fan 300 may not be configured to generate any measurable amount of thrust, and instead may be configured to ingest air from a boundary layer of air of the fuselage 12 of the aircraft 10 and add energy/speed up such air to reduce an overall drag on the aircraft 10 (and thus increase a net thrust of the aircraft 10).

Referring particularly to FIGS. 4 and 6-7, the BLI fan 300 defines an inlet 334 at a forward end 336 between the nacelle 306 and the fuselage 12 of the aircraft 10. As mentioned above, the nacelle 306 of the BLI fan 300 extends around the central axis 15 of the aircraft 10 and the fuselage 12 of the aircraft 10 at the aft end of the aircraft 10. Accordingly, as shown, the inlet 334 of the BLI fan 300 extends substantially three hundred sixty degrees (360°) around the central axis 15 of the aircraft 10 and the fuselage 12 of the aircraft 10 when, such as in the embodiment depicted, the BLI fan 300 is mounted to the aircraft 10. Additionally, in still further embodiments, the BLI fan 300, or rather the external surface of the nacelle 306, may have any other suitable cross-sectional shapes along the axial direction $A_2$ (as opposed to the circular shape depicted) and the structural members 307 may not be evenly spaced along the circumferential direction $C_2$.

Figure 10:
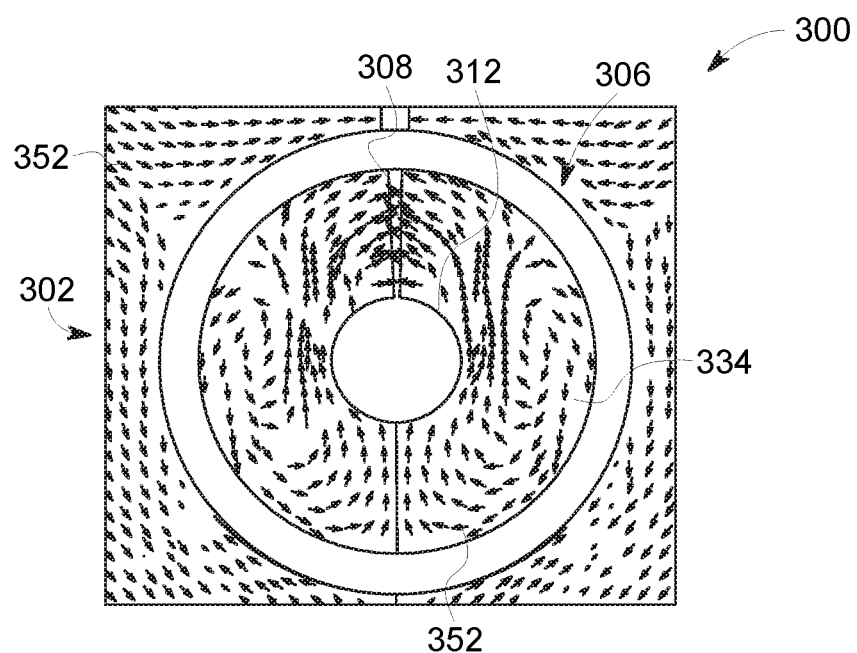
FIG. 10 illustrates a schematic, cross-sectional view of an aft engine of an aircraft, viewed along an axial centerline thereof so as to illustrate another embodiment of an inlet assembly according to the present disclosure.

Referring particularly to FIGS. 6 and 7, schematic, cross-sectional views of various embodiments of the BLI fan 300, viewed along an axial centerline 15 thereof so as to illustrate a low-distortion inlet assembly 302 configured with the inlet 334 of the fan 300 according to the present disclosure are illustrated. More specifically, as shown, the inlet assembly 302 includes a plurality of structural members 307 mounted at one or more predetermined radial locations around a circumference of the fan shaft 312 of the BLI fan 300. For example, as shown in FIG. 10, the predetermined radial locations as described herein may have a swirl distortion exceeding a predetermined threshold as illustrated by arrows 352. Further, it should be understood that the predetermined radial locations may be at the illustrated locations as well as any location therebetween and are meant to encompass locations having a high swirl distortion and/or a location where a modification of the airflow would have the highest impact of correcting the swirl distortion. In other words, for certain embodiments, the airflow entering the BLI fan 300 may be evaluated to determine a swirl pattern thereof. If the swirl distortion is deemed to cause damage to the fan 300, the structural members 307 can be chosen so as to reduce the swirl distortion and reduce such damage. Thus, the location and/or number of structural members 307, as well as the shape and orientation of the structural members 307, may be designed and chosen as a function of the swirl pattern. Accordingly, the structural member(s) 307 are configured to condition the airflow into the BLI fan 300 to, e.g., increase an efficiency of the BLI fan 300, or reduce a distortion of the air flowing into the BLI fan 300, which will be discussed in more detail below.

More specifically, as shown in FIGS. 6-10, the structural member(s) 307 may be configured as struts 309 (FIGS. 6-8 and 10), strakes 311 (FIG. 9), or any other suitable structural component. Generally, struts are structural components designed to resist longitudinal compression. In addition, the struts 309 of the present disclosure are configured to guide the airflow entering the BLI fan 300 axially, thereby preventing generation of stream-wise vorticity and eliminating the need of inlet guide vanes 308 in certain embodiments. Further, strakes generally refer to wing-like projections, airfoils, or vanes used to improve aerodynamic efficiency. As such, the struts 309 and/or strakes 311 of the present disclosure are strategically placed at the predetermined locations so as to redistribute the airflow entering the fan 300 more uniformly circumferentially so as to reduce swirl distortion at the inlet 334. In particular embodiments, the structural members 307 may be non-uniformly spaced along the circumferential direction $C_2$ of the BLI fan 300 around the fan shaft 312. In alternative embodiments, the structural members 307 may be evenly spaced along the circumferential direction $C_2$ of the BLI fan 300 around the fan shaft 312.

For example, as shown in FIG. 6, the illustrated inlet assembly 302 includes at least four struts 309 non-uniformly spaced around the circumference of the fan shaft 312. In further embodiments, the inlet assembly 302 may include more than four or less than four struts 309. In addition, as shown in FIG. 7, the inlet assembly 302 may include a combination of struts 309 and inlet guide vanes 308 spaced around the circumference of the fan shaft 312. In yet another embodiment, as shown in FIG. 9, the inlet assembly 302 may include a plurality of strakes 311.

Figure 8:
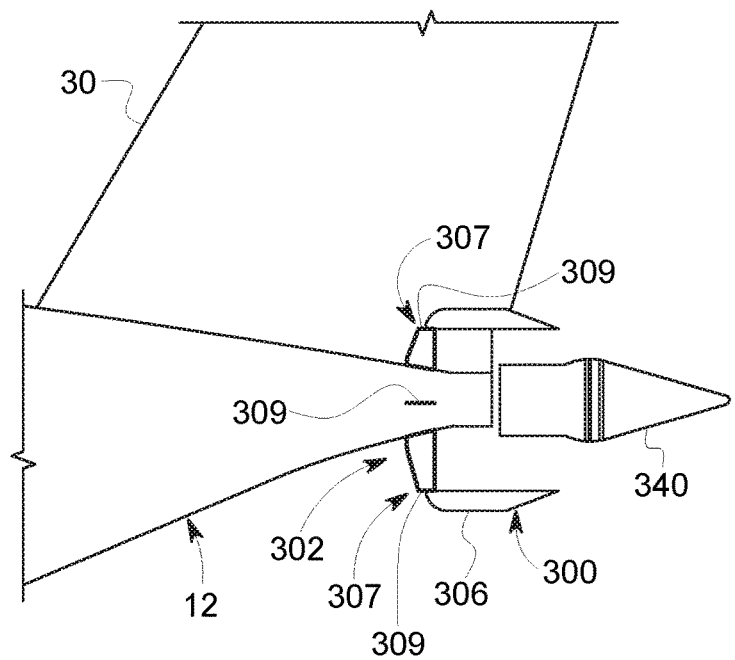
FIG. 8 illustrates a side view of one embodiment of an aft engine mounted to an aft end of an aircraft according to the present disclosure, particularly illustrating an inlet assembly having a plurality of struts integrated with the nacelle of the aft fan of the aft engine.
Figure 11:
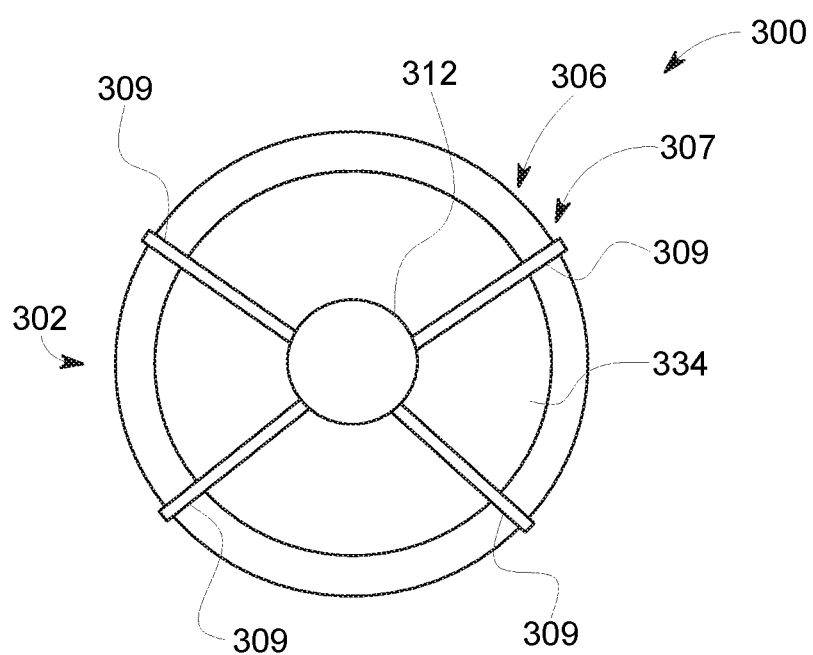
FIG. 11 illustrates a schematic, cross-sectional view of an aft engine of an aircraft, viewed along an axial centerline thereof so as to illustrate yet another embodiment of an inlet assembly according to the present disclosure.

In additional embodiments, the structural member(s) 307 may be integrated with at least one of the nacelle 306 of the fan 300 or the fuselage 12. More specifically, as shown in FIG. 8, the structural member(s) 307 may be integrated with the nacelle 306 so as to provide additional strength and/or support thereto. In addition, as shown in FIG. 11, the structural member(s) 307 may be integrated with and extend past the nacelle 306 of the BLI fan 300 in the radial direction $R_2$, e.g. as shown via struts 309. In such embodiments, the structural member(s) 307 may be configured to provide an aircraft control surface as well as reduce distortion entering the BLI fan 300. In further embodiments, as shown in FIG. 8, the structural member(s) 307 may extend in front of the nacelle 306 of the fan 300 in the axial direction $A_2$.

Figure 9:
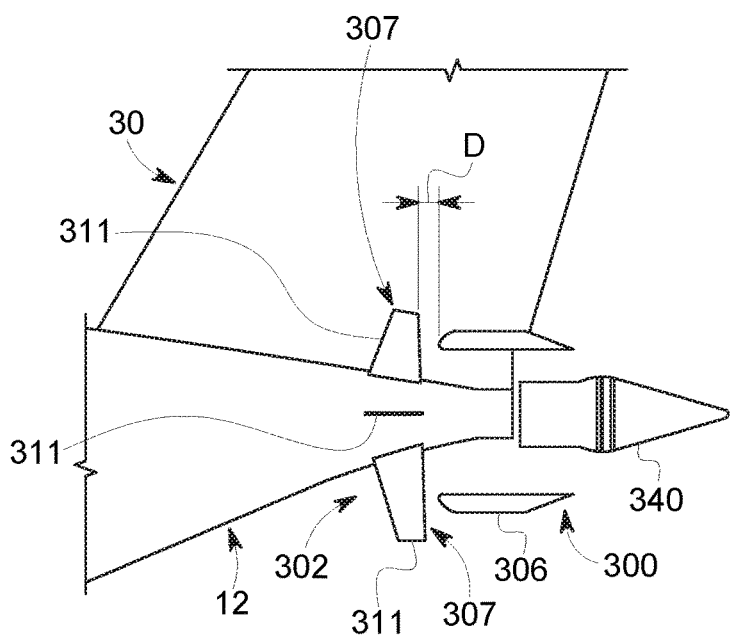
FIG. 9 illustrates a side view of one embodiment of an aft engine mounted to an aft end of an aircraft according to the present disclosure, particularly illustrating an inlet assembly having a plurality of strakes integrated with the fuselage of the aft fan of the aft engine and spaced apart from the nacelle.

Alternatively, as shown in FIG. 9, the structural member(s) 307, e.g. strakes 311, may be integrated with the fuselage 12. For example, as shown in the illustrated embodiment, the illustrated strakes 311 are spaced apart from the nacelle 306 by a distance D and are located upstream of the nacelle 306 of the BLI fan 300 in the axial direction $A_2$.

Figure 12:
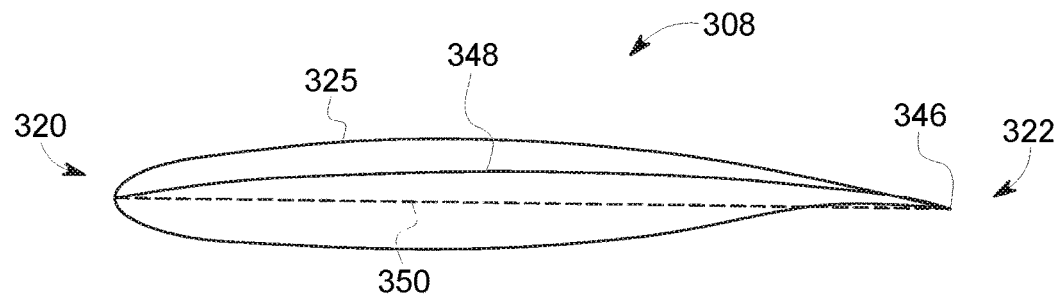
FIG. 12 illustrates a cross-sectional view of another embodiment of an inlet guide vane of an inlet guide vane assembly according to the present disclosure, particularly illustrating an upright inlet guide vane.
Figure 13:
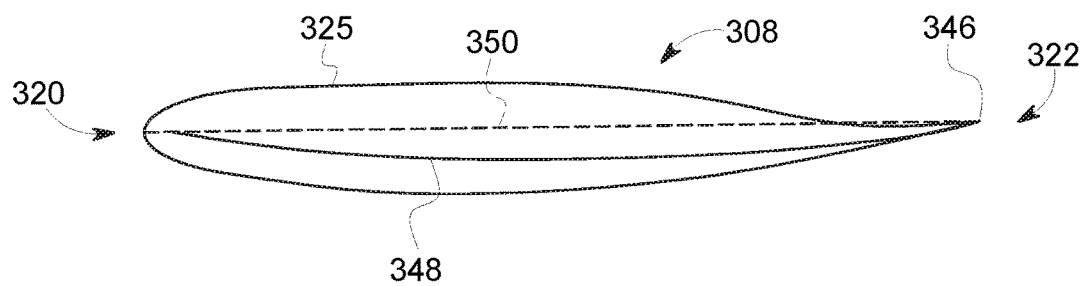
FIG. 13 illustrates a cross-sectional view of yet another embodiment of an inlet guide vane of an inlet guide vane assembly according to the present disclosure, particularly illustrating an inverted inlet guide vane.
Figure 14:
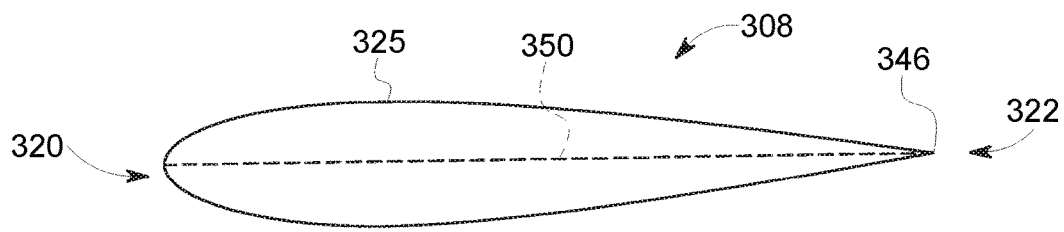
FIG. 14 illustrates a cross-sectional view of still another embodiment of an inlet guide vane of an inlet guide vane assembly according to the present disclosure, particularly illustrating a symmetrical inlet guide vane.

Referring now to FIGS. 12-14, cross-sectional views of various embodiments of the structural member(s) 307 of the present disclosure are illustrated. As shown, each of the structural member(s) 307 may have a unique shape and/or orientation corresponding to airflow conditions entering the BLI fan 300 at a particular location in the fan 300. As such, the structural member(s) 307 may be cambered to mitigate the swirl distortion and/or to pre-swirl the flow entering the fan 300. Thus, any combination of shapes may be used in the inlet assembly 302 and can be chosen based on a determined swirl distortion of the airflow entering the BLI fan 300.

It should be understood that the lift force generated by the structural member(s) 307 depends on the shape of its cross-section, especially the amount of camber (i.e. curvature such that the upper surface is more convex than the lower surface). In other words, increasing the camber generally increases lift. Therefore, the structural member(s) 307 can be tailored to reduce fan flow distortion by introducing variations of the member(s) 307. For example, as shown in FIGS. 11 and 12, one or more of the structural member(s) 307 may include a cambered cross-sectional shape configured to reduce swirl distortion entering the BLI fan 300. More specifically, as shown, the structural member(s) 307 may have a cambered upright airfoil cross-section (FIG. 12), a cambered inverted airfoil cross-section (FIG. 13), or a symmetrical airfoil cross-section (FIG. 14).

More specifically, as shown in FIG. 12, the cambered upright structural member 307 generally has a mean camber line 348 above the chord line 350 of the airfoil, with the trailing edge 346 of the structural member 307 having a downward direction. Such cambered airfoils typically generate lift at zero angle of attack and since air follows the trailing edge 346, the air is deflected downward. As shown in FIG. 13, the inverted structural member 307 generally has a mean camber line 348 below the chord line 350 of the airfoil, with the trailing edge 346 of the structural member 307 having an upward direction. When a cambered airfoil is upside down, the angle of attack can be adjusted so that the lift force is upwards. In contrast, as shown in FIG. 14, the mean camber line 348 and the chord line 350 of a symmetrical structural member 307 are the same (i.e. the lines 348, 350 overlap and there is zero camber).

Figure 15:
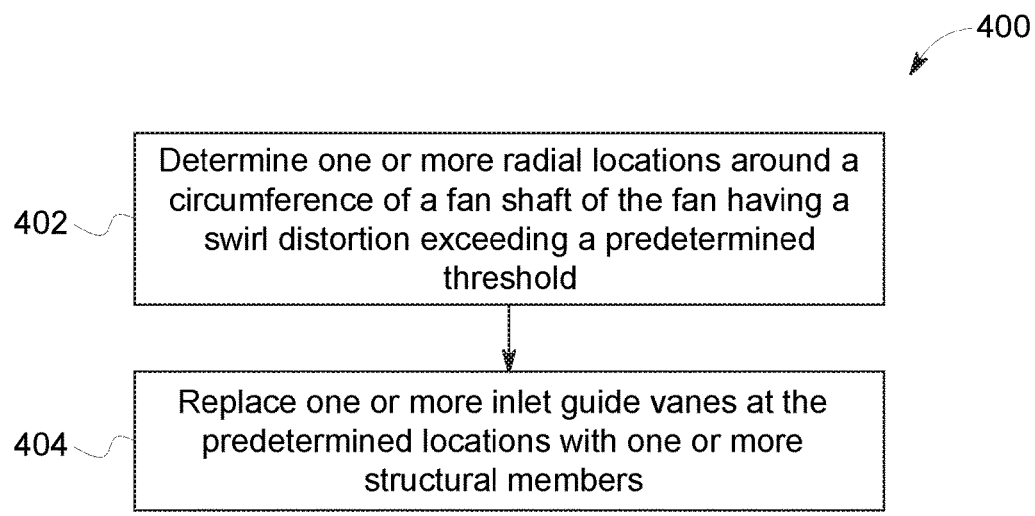
FIG. 15 illustrates a flow diagram of one embodiment of a method for retrofitting an aft fan of an aft engine with an inlet assembly so as to reduce swirl distortion at the inlet of the fan according to the present disclosure.

Referring now to FIG. 15, a flow diagram of one embodiment of a method 400 for retrofitting the BLI fan 300 with the inlet assembly 302 of the present disclosure so as to reduce swirl distortion at the inlet 334 of the BLI fan 300 is illustrated. As shown at 402, the method 400 includes determining one or more locations around a circumference of the fan shaft 312 of the BLI fan 300 having a swirl distortion exceeding a predetermined threshold. More specifically, the step of determining the location(s) having a swirl distortion exceeding the predetermined threshold may include using computer modeling and/or system monitoring to determine which locations around the circumference of the inlet experience the highest swirl distortion. As shown at 404, the method 400 includes replacing one or more inlet guide vanes 308 at the predetermined locations with one or more structural members 307. More specifically, as mentioned, the structural member(s) 307 may include struts 309, strakes 311, or any other suitable structural component. Further, in one embodiments, the method 400 may include replacing all of the inlet guide vanes with a fewer number of structural members 307. As such, the retrofitted inlet assembly 302 is configured to reduce drag and/or weight of the aircraft 10, while also reducing swirl distortion entering the BLI fan 300.

In yet another embodiment, it should be understood that the present disclosure may also include a method for initially assembling the BLI fan 300 with an inlet assembly 302 that reduces swirl distortion at the inlet 334 of the BLI fan 300. For example, in such an embodiment, the method may include determining one or more locations around a circumference of the fan shaft 312 of the BLI fan 300 having a swirl distortion exceeding a predetermined threshold. Further, the method includes mounting one or more structural members 307 and optionally one or more inlet guide vanes 308 at the predetermined locations. As such, the structural members 307 can be used alone or in combination with a fewer number of inlet guide vanes 308 so as to reduce drag and/or weight of the aircraft 10, while also reducing swirl distortion entering the BLI fan 300.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A boundary layer ingestion fan assembly for mounting to an aft end of a fuselage of an aircraft, the boundary layer ingestion fan assembly comprising:
   a fan rotatable about a central axis of the boundary layer ingestion fan assembly, the fan comprising a plurality of fan blades rotatable about a fan shaft;
   a nacelle surrounding the plurality of fan blades of the fan, the nacelle defining an inlet with the fuselage of the aircraft, the inlet extending substantially around the fuselage of the aircraft when the boundary layer ingestion fan is mounted at the aft end of the aircraft;
   a low-distortion inlet assembly configured with the inlet, the inlet assembly comprising:
      one or more inlet guide vanes configured within the inlet; and
      one or more structural members mounted at predetermined radial locations around a circumference of the fan shaft of the fan at the inlet, the structural members configured to reduce a swirl distortion entering the inlet of the fan.

2. The boundary layer ingestion fan assembly of claim 1, wherein the one or more structural members comprise at least one of a strut or a strake.

3. The boundary layer ingestion fan assembly of claim 1, wherein one or more of the structural members are integrated with at least one of the nacelle of the fan or the fuselage.

4. The boundary layer ingestion fan assembly of claim 3, wherein the one or more structural members are integrated with and extend past the nacelle of the fan in a radial direction.

5. The boundary layer ingestion fan assembly of claim 1, wherein one or more of the structural members extend in front of the nacelle of the fan in an axial direction.

6. The boundary layer ingestion fan assembly of claim 1, wherein one or more of the structural members are spaced apart from and upstream of the nacelle of the fan in an axial direction.

7. The boundary layer ingestion fan assembly of claim 1, wherein one or more of the structural members comprises a cambered cross-sectional shape configured to reduce swirl distortion entering the fan.

8. The boundary layer ingestion fan assembly of claim 1, wherein one or more of the structural members are non-uniformly spaced around the circumference of the fan shaft.

9. A low-distortion inlet assembly for an aft fan mounted to a fuselage of an aircraft, the inlet assembly comprising:
   a plurality of structural members mounted at predetermined radial locations around a circumference of the fan shaft of the fan at the inlet, the structural members configured to reduce a swirl distortion entering the inlet of the fan; and
   wherein the inlet assembly is absent of inlet guide vanes.

10. The inlet assembly of claim 9, wherein the one or more structural members comprise at least one of a strut or a strake.

11. The inlet assembly of claim 9, wherein one or more of the structural members are integrated with at least one of the nacelle of the fan or the fuselage.

12. The inlet assembly of claim 11, wherein the one or more structural members are integrated with and extend past the nacelle of the fan in a radial direction.

13. The inlet assembly of claim 9, wherein one or more of the structural members extend in front of the nacelle of the fan in an axial direction.

14. The inlet assembly of claim 9, wherein one or more of the structural members are spaced apart from and located upstream of the nacelle of the fan in an axial direction.

15. The inlet assembly of claim 9, wherein one or more of the structural members comprises a cambered cross-sectional shape configured to reduce swirl distortion entering the fan.

16. The inlet assembly of claim 9, wherein one or more of the structural members are non-uniformly spaced around the circumference of the fan shaft.

17. A method for retrofitting a boundary layer ingestion fan for an aft end of a fuselage of an aircraft with an inlet assembly configured to reduce swirl distortion at an inlet of the fan, the method comprising:
   determining one or more radial locations around a circumference of a fan shaft of the fan having a swirl distortion exceeding a predetermined threshold; and
   replacing one or more inlet guide vanes at the predetermined locations with one or more structural members.

18. The method of claim 17, wherein the one or more structural members comprise at least one of a strut or a strake.

19. The method of claim 17, further comprising replacing all of the inlet guide vanes with a fewer number of structural members.

\* \* \* \* \*